(12) United States Patent
Tong et al.

(10) Patent No.: US 9,671,576 B1
(45) Date of Patent: Jun. 6, 2017

(54) CWDM TRANSCEIVER MODULE

(71) Applicant: SAE Magnetics (H.K.) Ltd., Hong Kong (HK)

(72) Inventors: Dennis Tak Kit Tong, Hong Kong (HK); Vivian Wei Ma, Hong Kong (HK); Vincent Wai Hung, Hong Kong (HK)

(73) Assignee: SAE MAGNETICS (H.K.) LTD., Hong Kong (HK)

( * ) Notice: Subject to any disclaimer, the term of this patent is extended or adjusted under 35 U.S.C. 154(b) by 0 days.

(21) Appl. No.: 15/093,817

(22) Filed: Apr. 8, 2016

(51) Int. Cl.
  *G02B 6/12* (2006.01)
  *G02B 6/42* (2006.01)
  *H04B 10/40* (2013.01)

(52) U.S. Cl.
  CPC ......... *G02B 6/422* (2013.01); *G02B 6/12002* (2013.01); *G02B 6/12004* (2013.01); *G02B 6/12007* (2013.01); *H04B 10/40* (2013.01); *G02B 2006/12164* (2013.01)

(58) Field of Classification Search
  CPC ...... H01L 2924/00; H01L 2924/00014; G02B 6/43; G02B 6/12
  See application file for complete search history.

(56) References Cited

U.S. PATENT DOCUMENTS

| | | | |
|---|---|---|---|
| 6,198,864 B1 | 3/2001 | Lemoff et al. | |
| 6,201,908 B1 | 3/2001 | Grann | |
| 7,184,621 B1 | 2/2007 | Zhu | |
| 7,306,378 B2 * | 12/2007 | Alduino | G02B 6/4214 385/14 |
| 8,346,037 B2 | 1/2013 | Pezeshki et al. | |
| 8,540,437 B2 | 9/2013 | Lee et al. | |
| 9,002,161 B2 * | 4/2015 | Kasahara | G02B 6/4204 385/33 |

* cited by examiner

*Primary Examiner* — Jennifer Doan

(57) ABSTRACT

A CWDM transceiver module includes: a substrate; a plurality of light sources disposed on the substrate; a spacer layer disposed above the substrate, a cavity being defined in the space layer to accommodate the light sources; a cap layer transparent to light emitted from the light sources and disposed on the spacer layer, a notch for assembling a waveguide being formed in the cap layer; a plurality of lenses disposed on the cap layer facing the light sources; reflector coating and filter coating disposed on surfaces of the cap layer; an active alignment element disposed on the cap layer; and a reflector disposed at bottom of the notch.

17 Claims, 6 Drawing Sheets

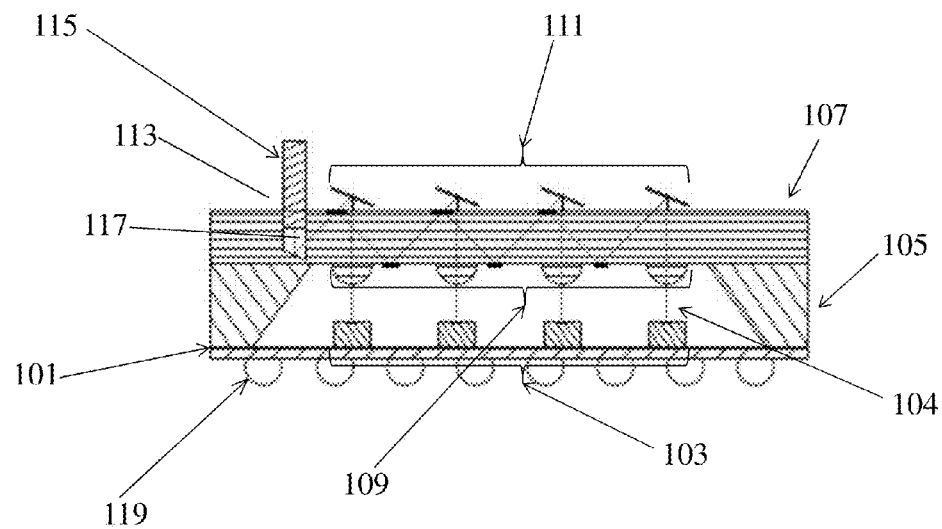
FIG. 1
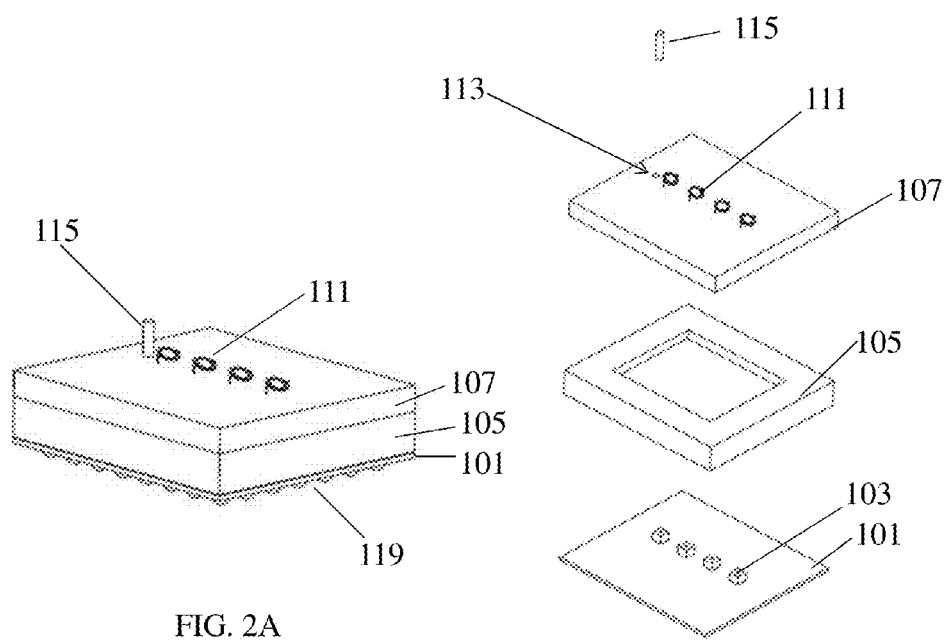
FIG. 2A
FIG. 2B

CWDM TRANSCEIVER MODULE

FIELD OF THE PATENT APPLICATION

The present patent application generally relates to optical communication systems and more specifically to a CWDM transceiver module.

BACKGROUND

Optical link has replaced electrical link for long distance communication over the past decades, and recent computation and communication systems place huge demands on increasing speed and data volume. To enlarge the transmission capacity, an efficient bandwidth utilization method, wavelength division multiplexing (WDM) is widely used now by transmitting several channels at different optical wavelengths into a single optical channel.

Wavelength division multiplexing (WDM) is a technology that multiplexes optical signals with different wavelengths into a single optical fiber or other destination, and later spatially disburses the multi-wavelength light from a fiber optic waveguide into individual wavelength bands, and direct them to individual fiber optic waveguide output lines, light detectors, etc.

Since different modes of the fiber travel at different speeds, multimode fibers have the difficulty to couple the different wavelength optical signals in parallel and transmit them simultaneously. Single mode fibers can give a higher transmission rate and up to 50 times more distance than multimode due to that its small core and depressed dispersion, their ability to couple multiple wavelength optical signals simultaneously made them be widely used in WDM technology for long distance optical communication.

In fiber optical communication applications, aligning light source to optical fibers or other types of waveguide is always an important issue. Multimode fibers have the core size relatively large, at about 50 um, so the tolerances can be substantially loose. In single mode transmission, the light receiving region of a photodiode is tens of micron in diameter, the laser source typically has a mode size of only a few micron, and a core of an optical fiber just has approximate 8 um in diameter. Thus, the presence of a manufacture error in the optical transmitting and receiving module may result in a large loss of optical signals. Tolerances on the order of a tenth of a micron are strongly required, hence, the alignment is a difficult and complicit process in manufacture.

In CWDM transceiver modules, alignment among light source, fiber/wave guide, and detector has seriously impacted on signal transmission, especially the alignment to couple light sources to the single mode fiber which has a mode size of only 8 um in diameter. Again, the alignment is a difficult and complicit process in manufacturing. It is therefore desired to have a batch fabricated CWDM transmitter that can lower the cost, and an active alignment method implemented by integrated MEMS platform, which can increase the alignment accuracy and simplify the alignment process.

SUMMARY

The present patent application is directed to a CWDM transceiver module. In one aspect, the CWDM transceiver module includes: a substrate, the substrate being a submount with TSV; a plurality of light sources disposed on the substrate; a spacer layer disposed above the substrate, a cavity being defined in the space layer to accommodate the light sources; a cap layer transparent to light emitted from the light sources and disposed on the spacer layer, a notch for assembling a waveguide being formed in the cap layer; a plurality of lenses disposed on the cap layer facing the light sources; reflector coating and filter coating disposed on surfaces of the cap layer; an active alignment element disposed on the cap layer; a reflector disposed at bottom of the notch; and solder balls disposed under the substrate for assembling the module on a PCB.

The light sources, having different wavelengths and emitting light beams perpendicular to the substrate, may be aligned in a first line. The plurality of lenses may be aligned in a second line vertically above the first line, while the active alignment element may be disposed vertically above the second line.

The reflector coating and filter coating may be distributed pads. The reflector coating pads may be deposited at a bottom surface of the cap layer and in between every two lenses sequentially and configured to totally reflect light in every wavelength. The filter coating pads may be cascadly deposited in light path at a top surface of the cap layer and configured to be wavelength specific, transmitting light within one wavelength and reflecting light within other wavelength ranges.

The active alignment element may include a mirror array. The mirror array includes a plurality of mirror structures, while each mirror structure includes a gimbal and a mirror plate. The gimbal may be supported by a pair of beams suspended on the cap layer, and configured to rotate around the beams in a first direction.

The mirror plate may be supported by a pair of beams connected to gimbal, and the beams supporting the mirror plate may be perpendicular to the beams supporting the gimbal, so that the mirror plate can rotate in a second direction that is perpendicular to the first direction. The mirror plate and the gimbal may be fixedly engaged with the rest of the CWDM transceiver module.

The notch may be a rectangular tube in the cap layer at an extended second line, with its longitudinal direction being perpendicular to the cap layer surface. The notch may be formed with one side facing light path and with a curved reflecting surface at bottom for assembling the waveguide. The curved reflecting surface may have a sphere shape intersecting the notch with a certain angle in its longitudinal direction, and be configured to reflect injected light and focus the light to the waveguide.

In another aspect, the present patent application provides a CWDM transceiver module that includes: a substrate; a plurality of light sources disposed on the substrate; a spacer layer disposed above the substrate, a cavity being defined in the space layer to accommodate the light sources; a cap layer transparent to light emitted from the light sources and disposed on the spacer layer, a notch for assembling a waveguide being formed in the cap layer; a plurality of lenses disposed on the cap layer facing the light sources; reflector coating and filter coating disposed on surfaces of the cap layer; an active alignment element disposed on the cap layer; and a reflector disposed at bottom of the notch.

The light sources, having different wavelengths and emitting light beams perpendicular to the substrate, may be aligned in a first line. The plurality of lenses may be aligned in a second line vertically above the first line. The active alignment element may be disposed vertically above the second line.

The active alignment element may have an elongated gimbal and a plurality of mirrors supported simultaneously on the gimbal, the mirrors being aligned vertically above the second line. The notch may be a rectangular tube in the cap layer, being apart from the second line, with its longitudinal direction being perpendicular to the cap layer. The notch may be formed with one side facing light path and with a curved reflecting surface at bottom for assembling the waveguide.

The reflector coatings may be deposited at both top and bottom surfaces of the cap layer and configured to totally reflect light in every wavelength. The lenses may be located in the cap layer, among which a first lens collects light beams directed by the active alignment elements and reflected by the reflected coating, and a second lens collects light beams from the first lens and guides the light beams to the notch.

The light sources, having different wavelengths, may be aligned in a first line emitting light beams parallel to the substrate. An angled reflecting surface on the substrate may be parallel to the first line and configured to change the light beams to a direction perpendicular to the substrate. The plurality of lenses may be aligned in a second line vertically above the angled reflecting surface. The active alignment elements may be aligned in a third line vertically above the second line.

The CWDM transceiver module may further include an additional holder with a cavity disposed on and bonded to the cap layer. The cavity may be configured to accommodate the active alignment element. A notch for assembling a waveguide may be formed in the cap layer and the additional layer.

BRIEF DESCRIPTIONS OF THE DRAWINGS

FIG. 1 is a cross-sectional view of a CWDM transceiver module in accordance with an embodiment of the present application.

FIG. 2A is a perspective view of the CWDM transceiver module depicted in FIG. 1.

FIG. 2B is an exploded view of the CWDM transceiver module depicted in FIG. 1.

DETAILED DESCRIPTION

Figure 3A:
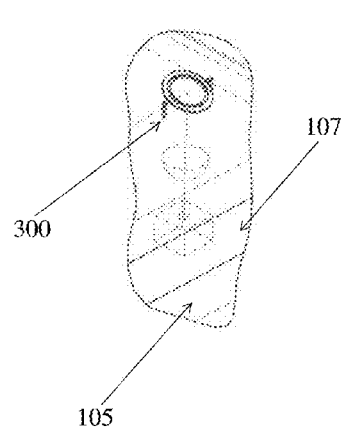
FIG. 3A is a magnified perspective view illustrating the active alignment element depicted in FIG. 1.

Reference will now be made in detail to a preferred embodiment of the CWDM transceiver module disclosed in the present patent application, examples of which are also provided in the following description. Exemplary embodiments of the CWDM transceiver module disclosed in the present patent application are described in detail, although it will be apparent to those skilled in the relevant art that some features that are not particularly important to an understanding of the CWDM transceiver module may not be shown for the sake of clarity.

Furthermore, it should be understood that the CWDM transceiver module disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

FIG. 1 is a cross-sectional view of a CWDM transceiver module in accordance with an embodiment of the present application. FIG. 2A is a perspective view of the CWDM transceiver module depicted in FIG. 1. FIG. 2B is an exploded view of the CWDM transceiver module depicted in FIG. 1. Referring to FIGS. 1-2B, the CWDM transceiver module includes: a submount 101 with TSV as an electrical connection holding a plurality of light sources 103 (VCSEL array), a spacer layer 105 disposed above the TSV submount 101 having a cavity to accommodate the light sources 103, a cap layer 107 (a glass layer in this embodiment) transparent to the light beams 104 from the light sources 103 and disposed on the spacer layer 105, a lens array 109 disposed on the cap layer 107 facing the light sources 103, reflector coating and filter coating disposed on the surfaces of cap layer, and an active alignment element 111 (or an array of alignment elements), which is a mirror array in this embodiment, disposed on the cap layer 107. A notch 113 for assembling fiber (waveguide) 115 is formed in the cap layer 107. At the bottom of the notch 113, there is a reflector 117 with suitable angle. The CWDM transceiver module further includes solder balls 119 disposed under the TSV submount 101 for assembling the module on a PCB by SMT process.

Figure 3B:
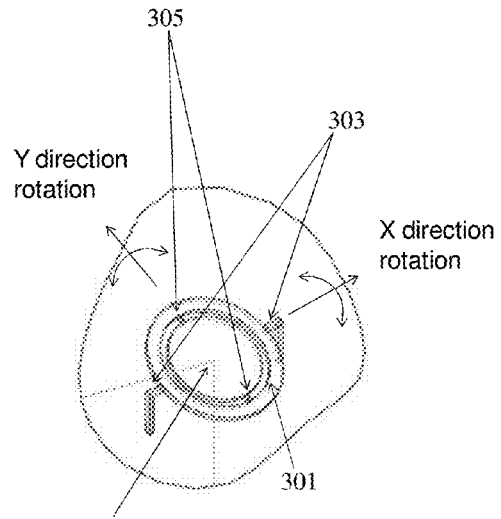
FIG. 3B is a perspective view of the active alignment element depicted in FIG. 3A.

FIG. 3A is a zoomed view illustrating the relation among active alignment element, lens and light source, which are depicted in FIG. 1. FIG. 3B is a perspective view of the active alignment element depicted in FIG. 3A. Referring to FIGS. 3A and 3B, the active alignment element 300 includes a mirror 304 with a gimbal 301. The gimbal 301 is supported by a pair of opposite beams 303 suspended on the cap layer 107, and configured to rotate around the beams in the first direction (X direction). The mirror plate 304 is supported by a pair of opposite beams 305 connected to gimbal 301. The beams 305 supporting the mirror plate 304 are perpendicular to the beams 303 supporting the gimbal 301, so that the mirror plate 304 can rotate in a second direction (Y direction), which is a direction perpendicular to the gimbal rotation direction (X direction), the first direction. The mirror and gimbal can be actuated independently, by electrostatic, thermos-electronic, electromagnetic actuation or any other actuation methods.

The rotation angle Θ can be defined as:

$$\Theta = T/K;$$

where T is the torque, and K is the effective rotational stiffness.

Suppose the rotation beam has rectangular shape in cross section, L is the beam length, w is the beam width and t is the beam thickness, the effective rotation stiffness can be defined as:

If t>>w, $$K = \frac{Gw^3 t}{8L}\left(5.33 - 3.36\frac{w}{t}\left(1 - \frac{w^4}{12t^4}\right)\right).$$

If w>>t, $$K = \frac{Gt^3 w}{8L}\left(5.33 - 3.36\frac{t}{w}\left(1 - \frac{t^4}{12w^4}\right)\right).$$

where G is the Elastic Modulus.

In the system, the torque T is always induced by the active force F, an effective one generated through electrostatic, thermo-electronic or electromagnetic actuation, toward the rotation axis with a perpendicular distance r:

$$T = F*r;$$

Both the gimbal and mirror in the active alignment element can be activated independently and have the rotation angle Θ governed by above equations. The combination of these two perpendicular independent rotations can make the mirror reflect light in any direction.

Figure 4A:
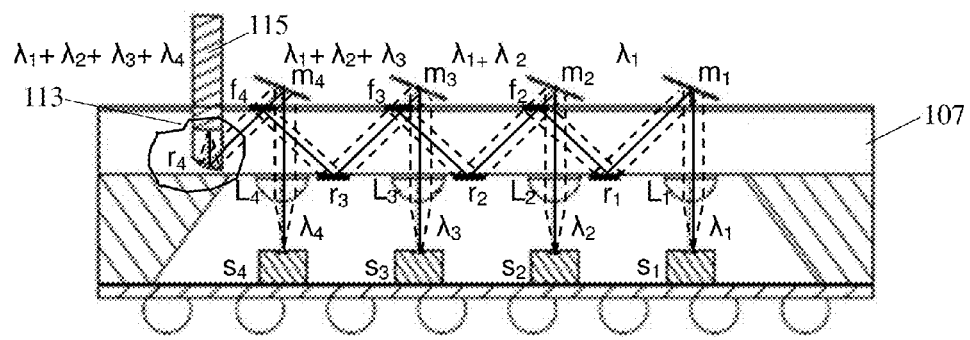
FIG. 4A is a cross-sectional view of the CWDM transceiver module depicted in FIG. 1.
Figure 4B:
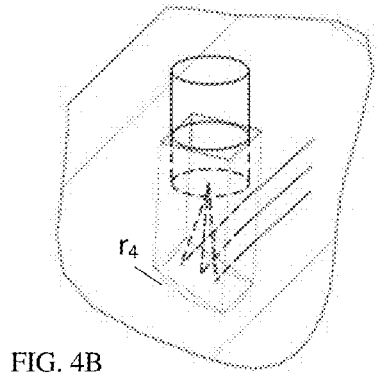
FIG. 4B is a magnified perspective view illustrating the notch in the CWDM transceiver module depicted in FIG. 4A.
Figure 4C:
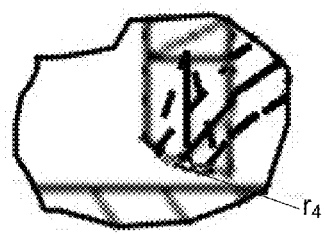
FIG. 4C is a magnified cross-sectional view illustrating the curved reflecting surface r4 depicted in FIG. 4B.

FIG. 4A shows the working principle of this CWDM transceiver module with active alignment elements by using the cross-sectional view depicted in FIG. 1. FIG. 4B is a magnified perspective view illustrating the notch in the CWDM transceiver module depicted in FIG. 4A. FIG. 4C is a magnified cross-sectional view illustrating the curved reflecting surface r4 depicted in FIG. 4B. Referring to FIGS. 4A-4C, the optical part of the CWDM transceiver module includes: light sources si (s1, s2, s3 and s4 in FIG. 4A) aligned in one line and emitting light upwards (laser VCSEL), lenses for collimation Li (L1, L2, L3 and L4 in FIG. 4A) aligned in another line vertically above the line formed by light sources, mirrors with gimbal mi (m1, m2, m3 and m4 in FIG. 4A) aligned in one line vertically above the line formed by the lenses, reflector (coating) r1, r2, and r3, configured to totally reflect light in every wavelength, deposited at the bottom surface of the cap layer 107 and in between every two lenses sequentially, filter (coating) f2, f3 and f4, deposited at the top surface of the cap layer 107 cascadly and in a suitable position for every light path, which are configured to be wavelength specific, transmitting light within one wavelength and reflecting light within other wavelength ranges, a notch 113 with a squared cross-section for assembling fiber/waveguide with a curved reflecting surface r4 at the bottom, and the fiber/waveguide 115. Light source si, lens Li and mirror with gimbal mi are vertically aligned. Referring to FIG. 4B, the surface of r4, which is also referred to as the reflector 117, has a sphere shape intersecting the notch with a certain angle in its longitudinal direction and is configured to reflect injected light and focus the light to the fiber/waveguide 115 (FIGS. 4B and 4C). In this embodiment, the filter f2 only allows light with wavelength λ2 which comes from light source s2 and reflected by active alignment element m2 to pass through and reflects light with other wavelength, the filter f3 only allows light with wavelength λ3 which comes from light source s3 and reflected by active alignment element m3 to pass through and reflects light with other wavelength, while the filter f4 only allows light with wavelength λ4 which comes from light source s4 and reflected by active alignment element m4 to pass through and reflects light with other wavelength.

Referring to FIGS. 4A-4C, the light beam with wavelength λ1 from the light source s1 is collimated by the lenses L1, transmitting through the transparent cap, reaching the mirror m1, reflected by the mirror m1 back to the cap layer 107, reflected by the reflector r1, the filter f2, the reflector r2, the filter f3, the reflector r3, the filter f4 sequentially, refracted through one of the surfaces of the notch 113, injected to the curved reflecting surface r4, and then focused and guided to the fiber/waveguide 115.

The light beam with wavelength λ2 from s2 is collimated by L2, transmitting through the transparent cap, reaching m2, reflected by m2 back to the cap layer, passing through f2, reflected by r2, f3, r3, f4 sequentially, refracted through one of the surfaces of notch 113, injected to the curved reflecting surface r4, and then focused and guided to the fiber/waveguide 115.

The light beam with wavelength λ3 from s3 is collimated by L3, transmitting through the transparent cap, reaching m3, reflected by m3 back to the cap layer, passing through f3, reflected by r3, f4 sequentially, refracted through one of the surfaces of the notch 113, injected to the curved reflecting surface r4, and then focused and guided to the fiber/waveguide 115.

The light beam with wavelength λ4 from s4 is collimated by L4, transmitting through the transparent cap, reaching m4, reflected by m4 back to the cap layer, passing through f4, refracted through one of the surfaces of the notch 113, injected to the curved reflecting surface r4, reflected by r4, and then focused and guided to the fiber/waveguide 115.

In general, λ1 and λ2 combine together once coming out from f2, and then combine λ3 after f3, and so on. All the light beams with different wavelengths (four in this embodiment) are multiplexed after the final filter, f4 in this embodiment, and reflected into fiber/waveguide by r4. The light beams that the fiber/waveguide 115 receives are combination of λ1, λ2, λ3 and λ4.

In this embodiment, the mirror can actively guide every light beam and align it to the fiber/waveguide ultimately since it can reflect the light in every direction due to its gimbal structure. Once the active alignment guides the light with different wavelengths into the fiber/waveguide precisely, the mirror and its gimbal are fixed with respect to the rest of the CWDM transceiver module permanently by methods of solder, epoxy glue or any other method. In other words, the mirror and its gimbal are fixedly engaged with the rest of the CWDM transceiver module.

Figure 5A:
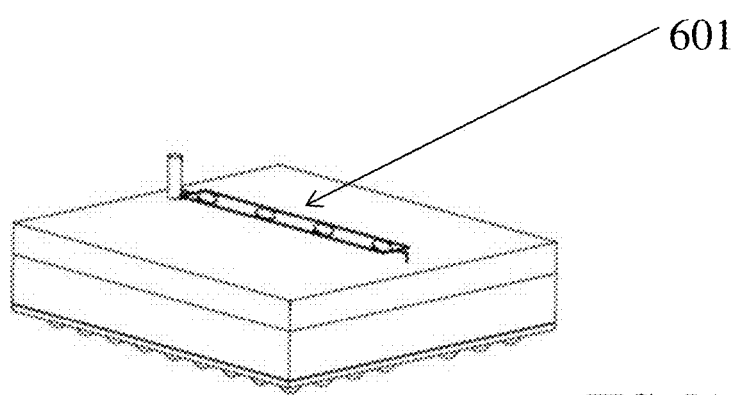
FIG. 5A is a perspective view of a CWDM transceiver module in accordance with another embodiment of the present patent application.
Figure 5B:
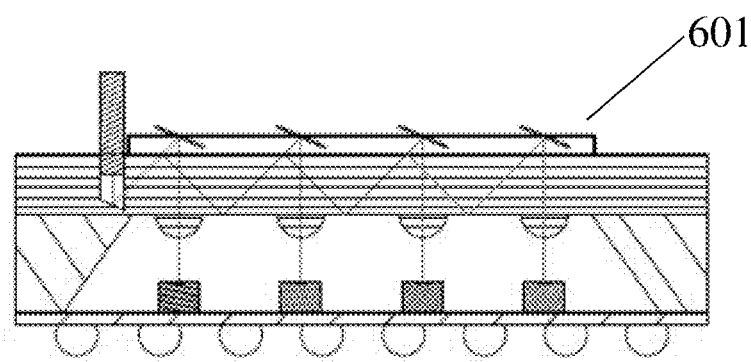
FIG. 5B is a cross-sectional view of the CWDM transceiver module depicted in FIG. 5A.
Figure 6:
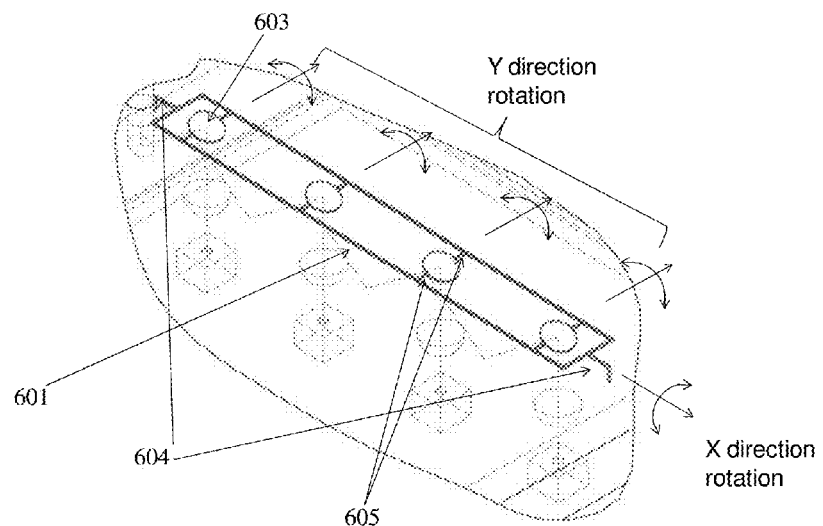
FIG. 6 illustrates is a magnified view illustrating an active alignment feature in the CWDM transceiver module depicted in FIG. 5A.

FIG. 5A is a perspective view of a CWDM transceiver module in accordance with another embodiment of the present patent application. FIG. 5B is a cross-sectional view of the CWDM transceiver module depicted in FIG. 5A. FIG. 6 illustrates is a magnified view illustrating an active alignment feature in the CWDM transceiver module depicted in FIG. 5A. Referring to FIGS. 5A-6, the elongated gimbal 601 along its rotation axis can accommodate more than one mirror at the same time. The gimbal 601 is supported by two opposite beams 604 on the cap layer, and can rotate around them in the first direction (X direction). Mirrors 603 are supported simultaneously on the gimbal 601 forming an array and also supported by the opposite beams 605. All the opposite beam pairs 605 supporting the mirrors 603 are perpendicular to the beams 604 supporting gimbal 601, so that the mirror can rotate in a second direction (Y direction) perpendicular to the gimbal rotation direction (X direction).

The gimbal 601 can be actuated independently, by electrostatic, thermos-electronic, electromagnetic actuation or any other actuation methods. The mirrors 603 can be actuated independently from the gimbal 601 and from each other, by electrostatic, thermos-electronic, electromagnetic actuation or any other actuation methods. Usually light path deviation from guiding into the fiber/waveguide is caused by fabrication bias, so the deviation has the same tendency. This deviation tendency can be adjusted by actuating the gimbal 601 to correct the light path, in which case, the mirrors 603 only need a minor adjustment in order to guide the light into the fiber/waveguide.

Figure 7A:
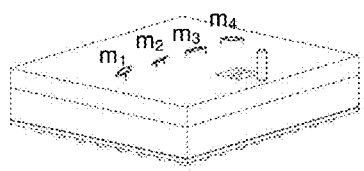
FIG. 7A is a perspective view of a CWDM transceiver module in accordance with yet another embodiment of the present patent application.
Figure 7B:
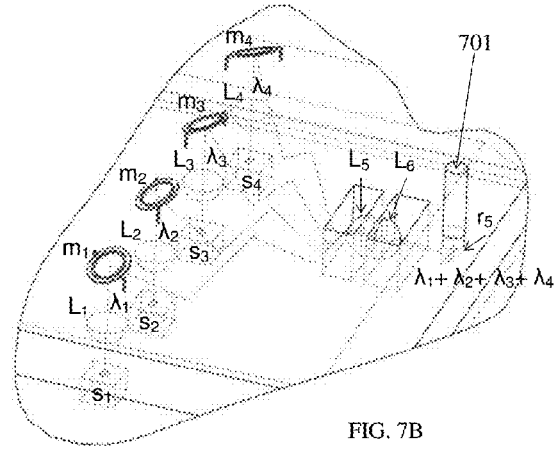
FIG. 7B is a partial magnified view of the CWDM transceiver module depicted in FIG. 7A.
Figure 8:
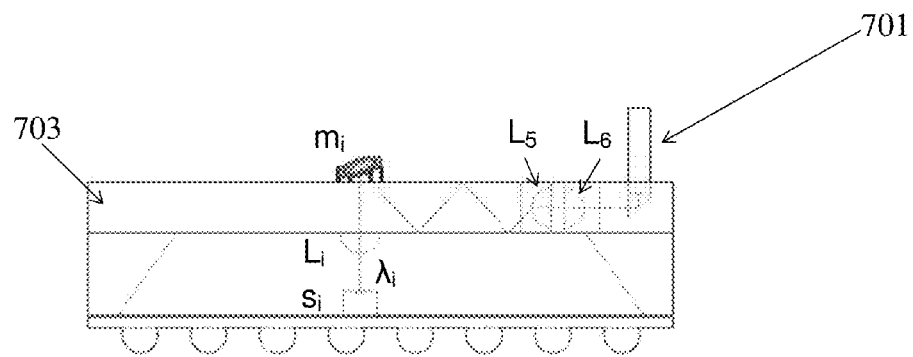
FIG. 8 is a cross-sectional view of the CWDM transceiver module depicted in FIG. 7A.

FIG. 7A is a perspective view of a CWDM transceiver module in accordance with yet another embodiment of the present patent application. FIG. 7B is a partial magnified view of the CWDM transceiver module depicted in FIG. 7A. FIG. 8 is a cross-sectional view of the CWDM transceiver module depicted in FIG. 7A. Referring to FIGS. 7A-8, in this CWDM transceiver module, light sources s1, s2, s3 and s4 are aligned in one line. The lenses for collimation, L1, L2, L3 and L4, are aligned in one line, vertically above the line formed by the light sources. The mirrors with gimbal, m1, m2, m3 and m4, are aligned in one line vertically above the line formed by the lenses. Reflector (coating) is disposed on both surfaces of the cap layer 703 away from the si (i=1 to 4) area. The position of the fiber/waveguide 701 is not aligned with mi, and is apart from the line formed by mi (i=1 to 4).

In the embodiment, fiber/waveguide 701 is on the center line of the line formed by mi. The light beam with wavelength λi from si is collimated by Li, transmitting through the transparent cap layer and reaching mi, reflected by mi back to the cap layer, and reflected by the reflector coating for three times. By adjusting the mirror structure mi, the light can be guided to L5 for collimation, then focused by L6 and guided to the reflecting surface r5, and finally reflected into the fiber/waveguide 701. The light beams that the fiber/waveguide 701 receives are combination of λ1, λ2, λ3 and λ4.

Once the active alignment element guides the light with different wavelengths into the fiber/waveguide 701 precisely, the mirrors and their gimbals are fixed with respect to the rest of the CWDM transceiver module permanently by method of solder, epoxy glue or any other method. In other words, the mirrors and their gimbals are fixedly engaged with the rest of the CWDM transceiver module.

Figure 9A:
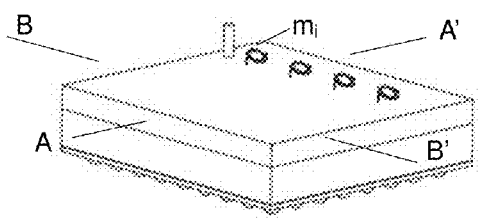
FIG. 9A is a perspective view of a CWDM transceiver module in accordance with still another embodiment of the present patent application.
Figure 9C:
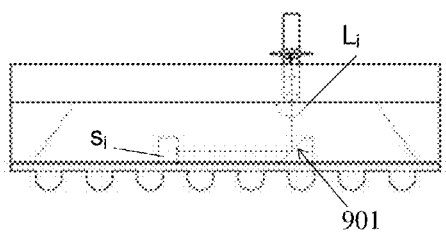
FIG. 9C is a cross-sectional view of the CWDM transceiver module depicted in FIG. 9A along line A-A'.
Figure 9B:
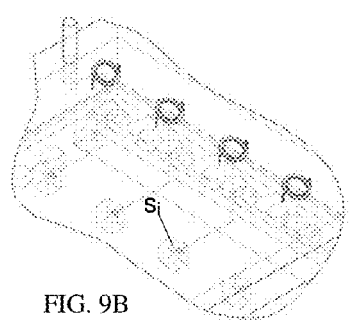
FIG. 9B is a partial magnified view of the CWDM transceiver module depicted in FIG. 9A.
Figure 9D:
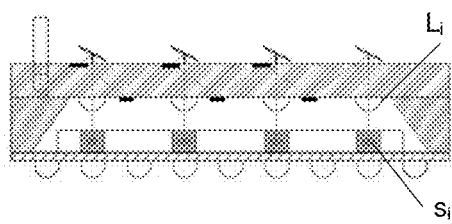
FIG. 9D is a cross-sectional view of the CWDM transceiver module depicted in FIG. 9A along line B-B'.

FIG. 9A is a perspective view of a CWDM transceiver module in accordance with still another embodiment of the present patent application. FIG. 9B is a partial magnified view of the CWDM transceiver module depicted in FIG. 9A. FIG. 9C is a cross-sectional view of the CWDM transceiver module depicted in FIG. 9A along line A-A'. FIG. 9D is a cross-sectional view of the CWDM transceiver module depicted in FIG. 9A along line B-B'. Referring to FIGS. 9A-9D, In the CWDM transceiver module, light beam comes from the edge of the light sources si (edge-emitting laser) so that the light path is parallel to the substrate. The light sources si are aligned in one line. The emitted light from the light sources is parallel and arranged perpendicular to the aligned line formed by them in the same direction. An angled reflecting surface 901 is formed on the substrate by MEMS fabrication process. The surface 901 can reflect the light emitted from the light sources and guide them to the lenses Li on glass. Lenses for collimation, Li, are aligned in one line observed from a top view. The aligned lenses are apart from the aligned light sources with a certain distance, and vertically above the angled reflecting surface 901. Mirrors with gimbals mi are aligned in one line, just above the aligned lenses Li. Reflector (coating) ri, filter (coating) fi, the notch for assembling the fiber/waveguide with the reflecting surface r4, and the fiber/waveguide are configured the same way as in the embodiment 1 in FIG. 1. The light beams with wavelength λi from si are reflected by angled reflecting surface 901 and guided to lenses Li respectively. Then the lights are multiplexed with the same method as illustrated in the embodiment in FIG. 1.

Figure 10:
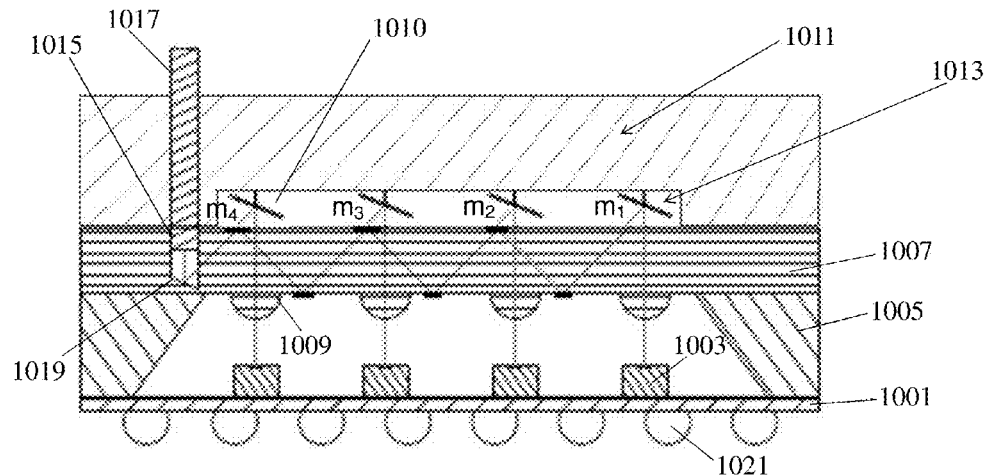
FIG. 10 is a cross-sectional view of a CWDM transceiver module in accordance with still another embodiment of the present patent application.

FIG. 10 is a cross-sectional view of a CWDM transceiver module in accordance with still another embodiment of the present patent application. Referring to FIG. 10, the CWDM transceiver module includes: a submount 1001 with TSV as a connection holding the light sources (laser array) 1003, a spacer layer 1005 disposed above the TSV submount 1001 having a cavity to accommodate the light sources 1003, a cap layer 1007 transparent to the light from the light sources (typically made of glass) disposed on the spacer layer 1005, a lens array 1009 disposed on the cap layer 1007 facing the light sources 1003, reflector coating and filter coating on the surfaces of the cap layer 1007, an additional holder 1011 with a cavity 1013 disposed on the cap layer 1007, and an active alignment element (or array) 1010 disposed on the additional holder 1011 and accommodated by the cavity 1013. The additional holder 1011 is bonded to the cap layer 1007 by wafer level fabrication techniques. The active alignment element 1010 is aligned to the lens array 1009 on the cap layer 1007 the same way as in the aforementioned embodiments. A notch 1015 is formed through the additional holder 1011 to the cap layer 1007 for assembling the fiber/waveguide 1017. At the bottom of the notch 1015, there is a reflector 1019 with a suitable angle. The CWDM transceiver module further includes solder balls 1021 under the TSV submount 1001 for assembling the module on a PCB by SMT process.

Figure 11:
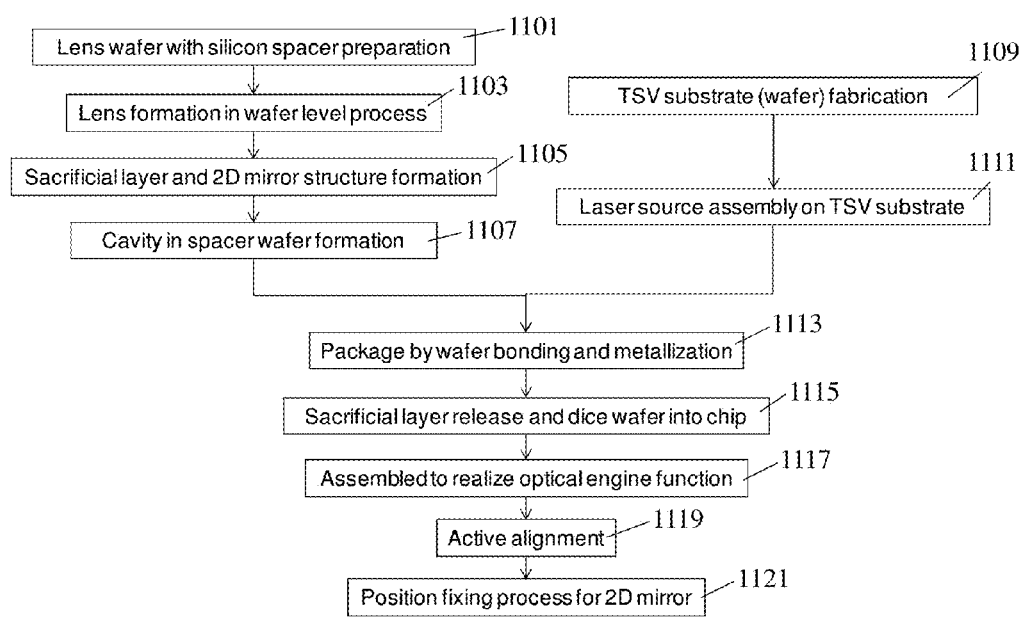
FIG. 11 is a flow chat illustrating a method for manufacturing a CWDM transceiver module in accordance with still another embodiment of the present patent application.

FIG. 11 is a flow chat illustrating a method for manufacturing a CWDM transceiver module in accordance with still another embodiment of the present patent application. Referring to FIG. 11, the method includes: preparing a lens wafer with a silicon spacer (step 1101); forming lenses in a wafer level process (step 1103), forming a sacrificial layer and a 2D mirror structure (i.e. the active alignment element) (step 1105); forming a cavity in the spacer wafer (step 1107). The method also includes: fabricating a TSV substrate wafer (step 1109); and forming a laser source assembly on the TSV substrate (step 1111). The method further includes: packaging by wafer bonding and metallization (step 1113); releasing the sacrificial layer and dicing the wafer to chips (step 1115); assembling to realize the optical engine function (step 1117); active alignment (step 1119); and fixing the position of the 2D mirror (step 1121).

The above embodiments provide a CWDM transceiver module with an integrated multiplexing system fabricated by MEMS technology. The integrated multiplexing system is mainly a MEMS structure, mirror with gimbal, for active alignment so as to loosen the alignment tolerance in fabrication and assembly. The embodiments actively align light sources into a fiber/waveguide (a single mode one especially) by an integrated MEMS platform in the optical communication system.

The package structure of the CWDM transceiver module includes the light sources, collimating lenses, MEMS structures, reflectors and filters, all made by wafer level fabrication process, which can provide a compact and cost effective CWDM transceiver module. The integrated MEMS mirrors in the CWDM transceiver module can rotate in two perpendicular directions independently by a gimbal structure. The method that actuating the MEMS structures to actively align the light from the light source to the fiber/waveguide in resolution of micron loosens the fabrication tolerance of tens of micron usually. The mirror is fixed with respect to the rest of the CWDM transceiver module once the optical coupling reaches the optimum situation after active aligning. Hence the alignment accuracy is improved and the alignment process is simplified.

While the present patent application has been shown and described with particular references to a number of embodiments thereof, it should be noted that various other changes or modifications may be made without departing from the scope of the present invention.

What is claimed is:

1. A CWDM transceiver module comprising:
   a substrate, the substrate being a submount with TSV;
   a plurality of light sources disposed on the substrate;
   a spacer layer disposed above the substrate, a cavity being defined in the space layer to accommodate the light sources;
   a cap layer transparent to light emitted from the light sources and disposed on the spacer layer, a notch for assembling a waveguide being formed in the cap layer;
   a plurality of lenses disposed on the cap layer facing the light sources;
   reflector coating and filter coating disposed on surfaces of the cap layer;
   an active alignment element disposed on the cap layer;
   a reflector disposed at bottom of the notch; and
   solder balls disposed under the substrate for assembling the module on a PCB.

2. The CWDM transceiver module of claim 1, wherein the light sources, having different wavelengths and emitting light beams perpendicular to the substrate, are aligned in a first line, the plurality of lenses are aligned in a second line vertically above the first line, while the active alignment element is disposed vertically above the second line.

3. The CWDM transceiver module of claim 1, wherein the reflector coating and filter coating are distributed pads; the reflector coating pads are deposited at a bottom surface of the cap layer and in between every two lenses sequentially and configured to totally reflect light in every wavelength; while the filter coating pads are cascadly deposited in light path at a top surface of the cap layer and configured to be wavelength specific, transmitting light within one wavelength and reflecting light within other wavelength ranges.

4. The CWDM transceiver module of claim 1, wherein the active alignment element comprises a mirror array, the mirror array comprises a plurality of mirror structures, while each mirror structure comprises a gimbal and a mirror plate.

5. The CWDM transceiver module of claim 4, wherein the gimbal is supported by a pair of beams suspended on the cap layer, and configured to rotate around the beams in a first direction.

6. The CWDM transceiver module of claim 4, wherein the mirror plate is supported by a pair of beams connected to gimbal, and the beams supporting the mirror plate are perpendicular to the beams supporting the gimbal, so that the mirror plate can rotate in a second direction that is perpendicular to the first direction.

7. The CWDM transceiver module of claim 4, wherein the mirror plate and the gimbal are fixedly engaged with the rest of the CWDM transceiver module.

8. The CWDM transceiver module of claim 1, wherein the notch is a rectangular tube in the cap layer at an extended second line, with its longitudinal direction being perpendicular to the cap layer surface; and the notch is formed with one side facing light path and with a curved reflecting surface at bottom for assembling the waveguide.

9. The CWDM transceiver module of claim 8, wherein the curved reflecting surface has a sphere shape intersecting the notch with a certain angle in its longitudinal direction, and is configured to reflect injected light and focus the light to the waveguide.

10. A CWDM transceiver module comprising:
    a substrate;
    a plurality of light sources disposed on the substrate;
    a spacer layer disposed above the substrate, a cavity being defined in the space layer to accommodate the light sources;
    a cap layer transparent to light emitted from the light sources and disposed on the spacer layer, a notch for assembling a waveguide being formed in the cap layer;
    a plurality of lenses disposed on the cap layer facing the light sources;
    reflector coating and filter coating disposed on surfaces of the cap layer;
    an active alignment element disposed on the cap layer; and
    a reflector disposed at bottom of the notch.

11. The CWDM transceiver module of claim 10, wherein the light sources, having different wavelengths and emitting light beams perpendicular to the substrate, are aligned in a first line, the plurality of lenses are aligned in a second line vertically above the first line, while the active alignment element is disposed vertically above the second line.

12. The CWDM transceiver module of claim 11, wherein the active alignment element has an elongated gimbal and a plurality of mirrors supported simultaneously on the gimbal, the mirrors being aligned vertically above the second line.

13. The CWDM transceiver module of claim 11, wherein the notch is a rectangular tube in the cap layer, being apart from the second line, with its longitudinal direction being perpendicular to the cap layer, and the notch is formed with one side facing light path and with a curved reflecting surface at bottom for assembling the waveguide.

14. The CWDM transceiver module of claim 13, wherein the reflector coatings are deposited at both top and bottom surfaces of the cap layer and configured to totally reflect light in every wavelength.

15. The CWDM transceiver module of claim 13, wherein the lenses are located in the cap layer, among which a first lens collects light beams directed by the active alignment elements and reflected by the reflected coating, and a second lens collects light beams from the first lens and guides the light beams to the notch.

16. The CWDM transceiver module of claim 10, wherein the light sources, having different wavelengths, are aligned in a first line emitting light beams parallel to the substrate; an angled reflecting surface on the substrate is parallel to the first line and configured to change the light beams to a direction perpendicular to the substrate; the plurality of lenses are aligned in a second line vertically above the angled reflecting surface; and the active alignment elements are aligned in a third line vertically above the second line.

17. The CWDM transceiver module of claim 10 further comprising an additional holder with a cavity disposed on and bonded to the cap layer, wherein the cavity is configured to accommodate the active alignment element; and a notch for assembling a waveguide is formed in the cap layer and the additional layer.

\* \* \* \* \*